United States Patent [19]
Larri

[11] Patent Number: 5,557,563
[45] Date of Patent: Sep. 17, 1996

[54] DATA PROCESSING METHOD AND APPARATUS INCLUDING ITERATIVE MULTIPLIER

[75] Inventor: Guy Larri, Cambridge, United Kingdom

[73] Assignee: Advanced Risc Machines Limited, Cambridge, United Kingdom

[21] Appl. No.: 297,694

[22] Filed: Aug. 26, 1994

[30] Foreign Application Priority Data

Mar. 11, 1994 [GB] United Kingdom .................. 9404767

[51] Int. Cl.⁶ ................................ G06F 7/52; G06F 7/38
[52] U.S. Cl. .............................................. 364/754; 364/736
[58] Field of Search ..................................... 364/754, 736, 364/715.04, 759

[56] References Cited

U.S. PATENT DOCUMENTS

4,868,777  9/1989  Nishiyama et al. .................... 364/754
5,126,963  6/1992  Fukasawa ........................... 364/715.04

Primary Examiner—Tan V. Mai
Attorney, Agent, or Firm—Albert C. Smith; John T. McNelis

[57] ABSTRACT

An iterative multiplier having a multiplier core generating partial results upon each iteration. When an early terminate of a multiply instruction occurs, at least one of the partial results is passed to a general purpose barrel shifter for bit realignment dependent upon the number of iterations performed before the early terminate occurred. The bit realigned partial results are then passed to an arithmetic logic unit where they are added to yield the final result.

10 Claims, 5 Drawing Sheets

PRIOR ART

DATA PROCESSING METHOD AND APPARATUS INCLUDING ITERATIVE MULTIPLIER

BACKGROUND OF THE INVENTION

1. Field of the Invention

This invention relates to the field of data processing. More particularly, this invention relates to data processing utilising a special purpose multiplier.

2. Description of the Prior Art

There is an established body of designs for digital circuits that produce the product of two input integer operands. It is also known to produce circuits that perform a multiplication and addition operation in response to a single "multiply-accumulate" instruction (e.g. (A*B)+C). Circuits that perform a multiplication and an addition can be considered to be an included subset of general purpose multiplier circuits.

In response to circuit area and cost constraints, it is known to provide such functions using a circuit that performs only a portion of the required multiplication operation at a time and to use that circuit iteratively to complete the full multiplication. An example of this is that if the product of two 32-bit numbers is required, it is possible to provide a circuit that produces the product of a 32-bit number and an 8-bit number to produce a partial result and to use this circuit four times to calculate the full 32-bit required result. The circuit which is repeatedly used within such systems is termed the multiplier core.

A sophisticated multiplier core aiming for high performance operation may use techniques such as Booth recoding and carry-save addition, whereas in a less demanding system a one bit per cycle "AND-gate and adder" multiplier core may be utilised.

Figure 1:
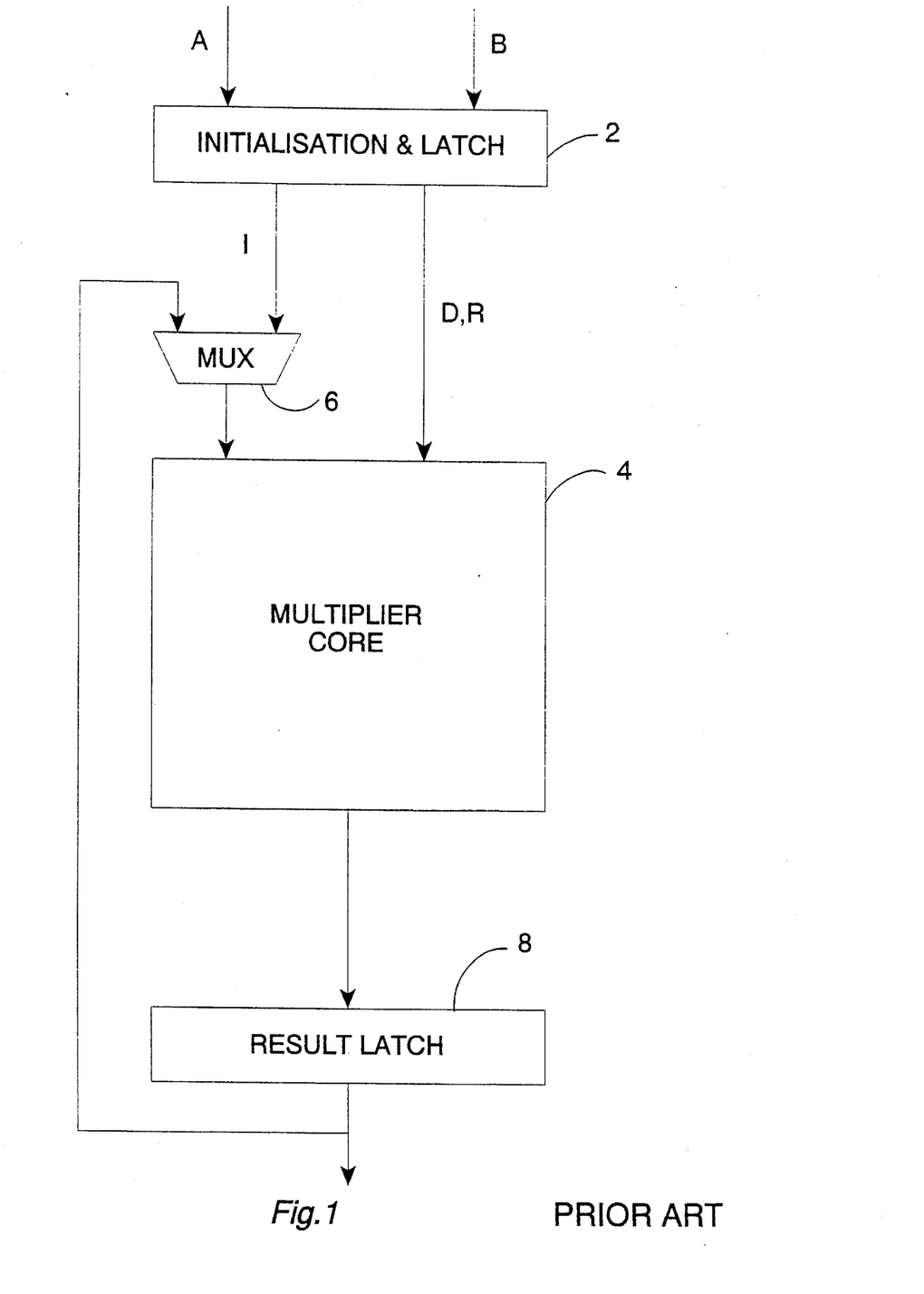
FIG. 1 illustrates an iterative multiplier.

FIG. 1 of the accompanying drawings illustrates an iterative multiplier. Two input operands A,B are supplied to an initialisation and latch circuit 2 where they are stored. The initialisation and latch circuit 2 initialises the rest of the circuit when it has latched the two operands and then outputs D and R (latched versions of A and B) directly to a multiplier core 4 and an initialisation value I via a multiplexer 6 to the multiplier core 4. The initialisation value I may be zero, or computed from A and B, depending on the type of multiplier core used. On each iterative cycle, the multiplier core 4 generates a partial result that is stored within a result latch 8. At least some of the bits of the partial result are fed back to the multiplier core 4 via the multiplexer 6 for the next iterative cycle. When the full number of cycles have been completed, the multiplication result is output from the result latch 8.

Figure 2:
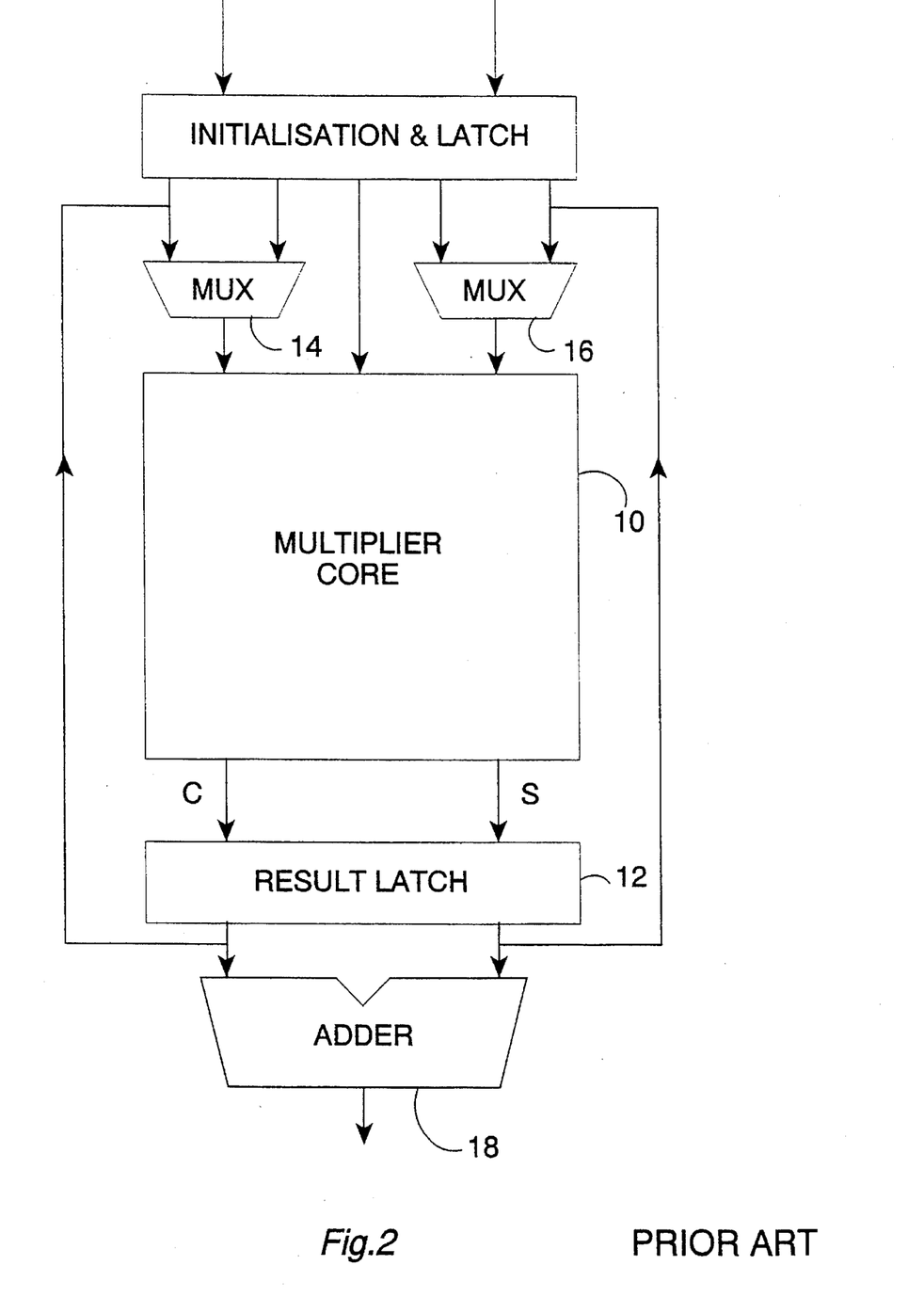
FIG. 2 illustrates an iterative multiplier using a redundant data representation.

The circuit of FIG. 1 utilises a standard binary representation of the operands and partial results throughout. FIG. 2 of the accompanying drawings illustrates a circuit using a redundant data representation within the multiplier core such that the result produced by the multiplier core on each iteration and after the final iteration is represented by two numbers that must be added to yield the standard binary representation (e.g. the carry result and the save result in a carry-save system). Circuits such as that illustrated in FIG. 2 yield a faster and/or less expensive multiplier core at the cost of having to perform a final addition to complete the multiplication.

FIG. 2 illustrates how two partial results C,S are output from a multiplier core 10 utilising a redundant data representation and stored within a result latch 12. At least some of the bits of these two partial results C,S are then fed back to the multiplier core 10 for the next iteration via respective multiplexers 14, 16. When the last iteration has been completed, the two partial results C,S are supplied to an adder 18 where they are subject to an addition operation to generate the final multiplication result.

A known refinement to multipliers as illustrated in FIGS. 1 and 2 is to provide a mechanism for early termination. Early termination is a technique intended to reduce the average number of iterations through the multiplier core (and hence the average time to perform a multiplication operation) by detecting situations in which further iterations through the multiplier core will not change the value of the multiplication result (typically because these iterations would each add only zero to the result). In some multiplier designs it is possible to determine the number of iterations that will be required by inspecting the value of the input operands. Typically, if one or both of the operands is small, fewer than the maximum number of iterations will be required, whereas if the operands are both large then all the iterations will be required.

Whilst the omitted iterations following such early termination do not change the value of the result, they typically change the position or "alignment" of the result on the output buses, as each iteration through the multiplier core gives a different weighting to the multiplier outputs. In order to deal with this, multipliers implementing early termination provide circuits to perform variable length shifts of the multiplier core outputs to counter the effect on the result alignment caused by any early termination.

Figure 3:
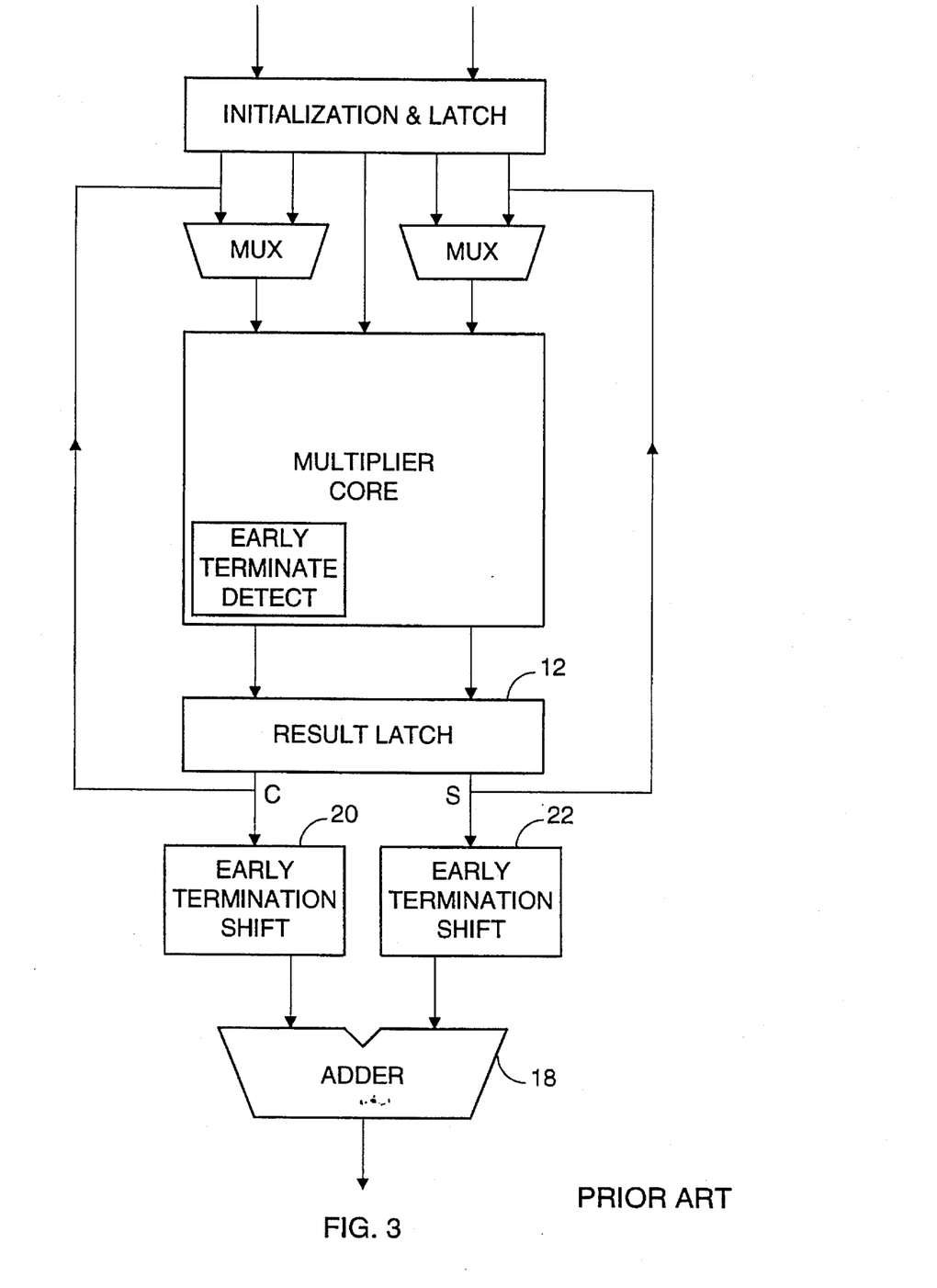
FIG. 3 illustrates an iterative multiplier using a redundant data representation and having an early terminate mechanism.

FIG. 3 of the accompanying drawings illustrates the circuit of FIG. 2 modified to provide an early termination capability. The circuit of FIG. 3 differs from that of FIG. 2 by the addition of respective early terminate shift mechanisms 20, 22 to act upon the partial results C,S. In operation, if the multiplication is to be early terminated, then the contents of the result latch 12 are passed through the early terminate shift mechanisms 20, 22 to undergo a degree of realignment dependent upon the stage at which the multiplication has been terminated. The realigned partial results are then combined by the adder 18.

SUMMARY OF THE INVENTION

An object of the invention is to provide multiplication circuits capable of high speed operation whilst maintaining a small circuit size. Small circuit size lowers manufacturing costs by allowing smaller integrated circuit die sizes, improves manufacturing yields and allows more space upon an integrated circuit for other functional elements.

Viewed from one aspect this invention provides apparatus for performing a selectable one of a plurality of different data processing operations upon one or more input operands, said data processing operation to be performed being selected by an instruction command, said apparatus comprising:

(a) an iterative multiplier for performing a multiplication operation to produce a multiplication result in response to a multiplication command, said iterative multiplier comprising:
  (i) a multiplier core;
  (ii) feedback means for feeding back partial results from an output of said multiplier core to an input of said multiplier core to effect iterative operation; and
  (iii) early terminating means for early terminating operation of said iterative multiplier when further iterations will not change said multiplication result;

(b) general purpose shifting means for performing a variable length shift upon an input operand in response one or more instruction commands other than said multiplication command; and (c) means responsive to early termination of said iterative multiplier for passing a partial result output from said multiplier core to said general purpose shifting means for bit realignment by said general purpose shifting means as part of generating said multiplication result.

The invention provides an iterative multiplier with an early termination mechanism. The system also has a general purpose shifting means for carrying out shifts required by instructions other than the multiply instructions executed by the multiplier core. This general purpose shifting means is reused in accordance with the invention to perform at least some of any bit realignment required subsequent to early termination of the multiplier core operation. Reusing the general purpose shifting means in this way avoids the need for one early terminate shift mechanism with a consequential advantageous decrease in the circuit area required to implement the multiplier.

The invention may be used in high performance systems in which said iterative multiplier uses a redundant data representation yielding at least two partial results upon each iteration.

A particularly preferred form of redundant data representation is a carry-save representation whereby relatively slow propagation of a carry bit along an adder chain is avoided.

In systems employing such redundant data representations, it will be appreciated that more than one partial result is produced upon each iteration. In this case, when an early terminate occurs, more than one partial result will need realigning. Accordingly, in preferred embodiments there is also provided at least one early terminate shifting means for bit realigning partial results not passed to said general purpose shifting means.

Whilst the general purpose shifting means can handle the realignment of one partial result and so avoid the need for one early terminate shift mechanism, other early terminate shift mechanisms will need to be provided for the high speed realignment of the other partial results in parallel with that performed by the general purpose shifting means.

In order to deal with such redundant data representations without compromising speed, it is preferred to provide an adder for producing said multiplication result from said partial results.

Such an adder can be arranged to provide a high performance addition operation.

Whilst it will be appreciated that the invention is applicable to differing applications (e.g. digital signal processors, computer central processing units, etc.) the reuse of a general purpose shifting means in combination with an iterative multiplier using a redundant data representation is particularly likely to be of advantage in embodiments in which said adder comprises an arithmetic logic unit for performing addition operations and logical operations.

In systems having an arithmetic logic unit and a general purpose shifting means, it is usual for the general purpose shifting means to be arranged in parallel with the arithmetic logic unit or downstream of the arithmetic logic unit. In contrast, in preferred embodiments of the invention said arithmetic logic unit has a plurality of operand inputs, one of said operand inputs being taken from an output of said general purpose shifting means.

Having the general purpose shifting means upstream of the arithmetic logic unit allows the general purpose shifting means to be reused in accordance with the invention to carry out bit alignment following multiplication early termination with the realigned result being passed to the arithmetic logic unit for addition as necessary.

Whilst the general purpose shifting means could take a number of forms, it is preferred that said general purpose shifting means comprises a barrel shifter.

Barrel shifters have an advantageously high speed performance for use in the context of the present invention.

The invention could be implemented as discrete circuit components and yield the advantage of reduced size and reduced number of circuit components. However, the invention is particularly suited to embodiment as an integrated circuit.

Viewed from another aspect the invention provides a method of performing a selectable one of a plurality of different data processing operations upon one or more input operands, said data processing operation to be performed being selected by an instruction command, said method comprising the steps of:

(a) in response to a multiplication command performing an iterative multiplication operation to produce a multiplication result, said iterative multiplication operation comprising:
  (i) generating partial results;
  (ii) feeding back said partial results to effect iterative operation; and
  (iii) early terminating said iterative multiplication when further iterations will not change said multiplication result;

(b) in response one or more instruction commands other than said multiplication command, performing a variable length shift with a general purpose shifting means upon an input operand; and (c) in response to early termination of said iterative multiplication operation, passing a partial result to said general purpose shifting means for bit realignment by said general purpose shifting means as part of generating said multiplication result.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 4:
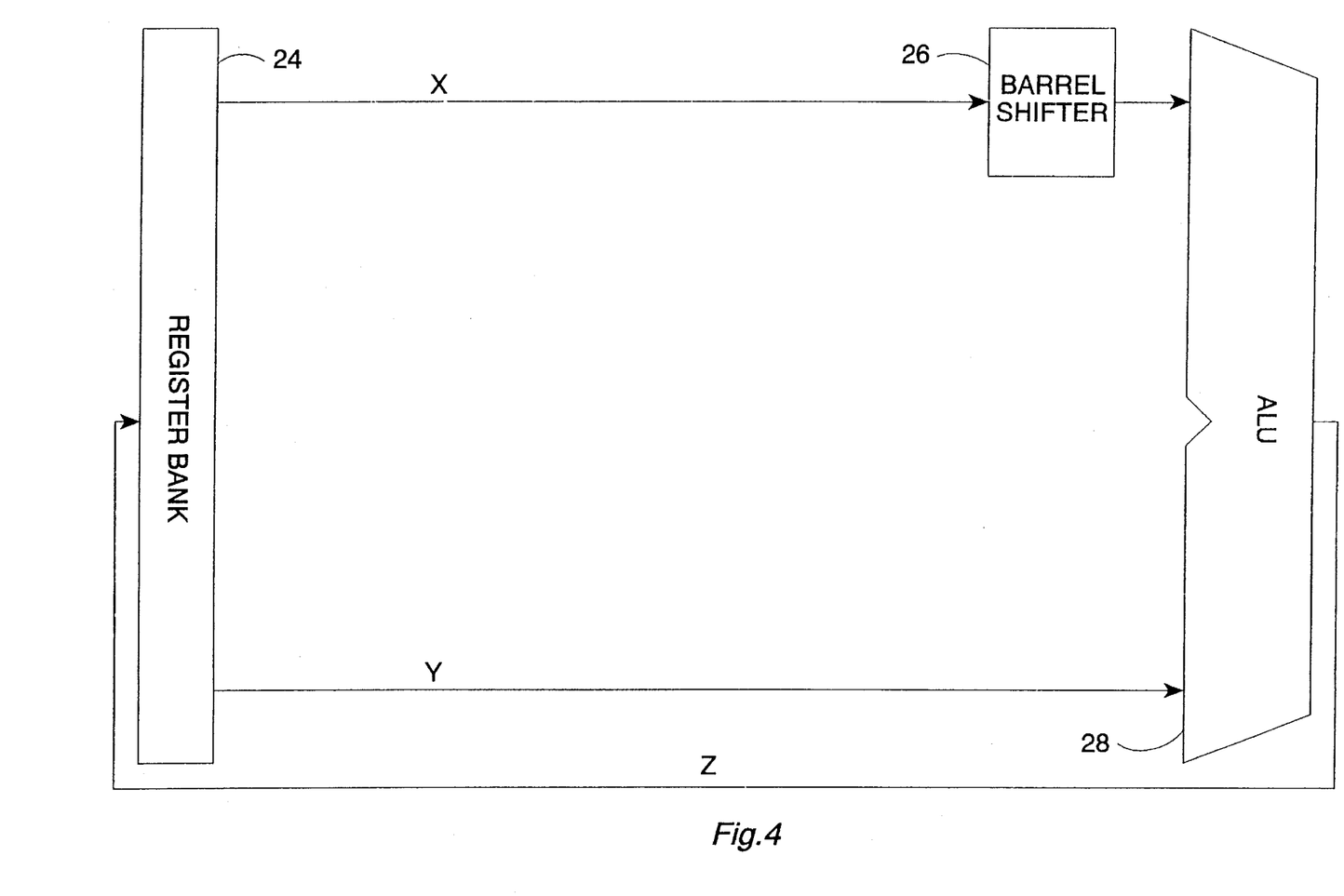
FIG. 4 illustrates an arithmetic logic unit and barrel shifter arrangement.

FIG. 4 illustrates the data path within a portion of a computer central processing unit. Operands upon which it is desired to perform arithmetic and logical operations are loaded within registers of a register bank 24. A first operand X is output from the register bank 24 to a general purpose barrel shifter 26 where it is subject to any desired variable length shift, as necessary, before being passed to an arithmetic logic unit 28. A second operand Y is output from the register bank 24 directly to the arithmetic logic unit 28.

The arithmetic logic unit 28 is of the known type that performs arithmetic operations such as addition (of which subtraction is a special type) and logical operations such as bit wise ANDs and XORs. The output result Z from the arithmetic logic unit 28 is passed back to the register bank 24 where it is stored fop subsequent manipulation.

Figure 5:
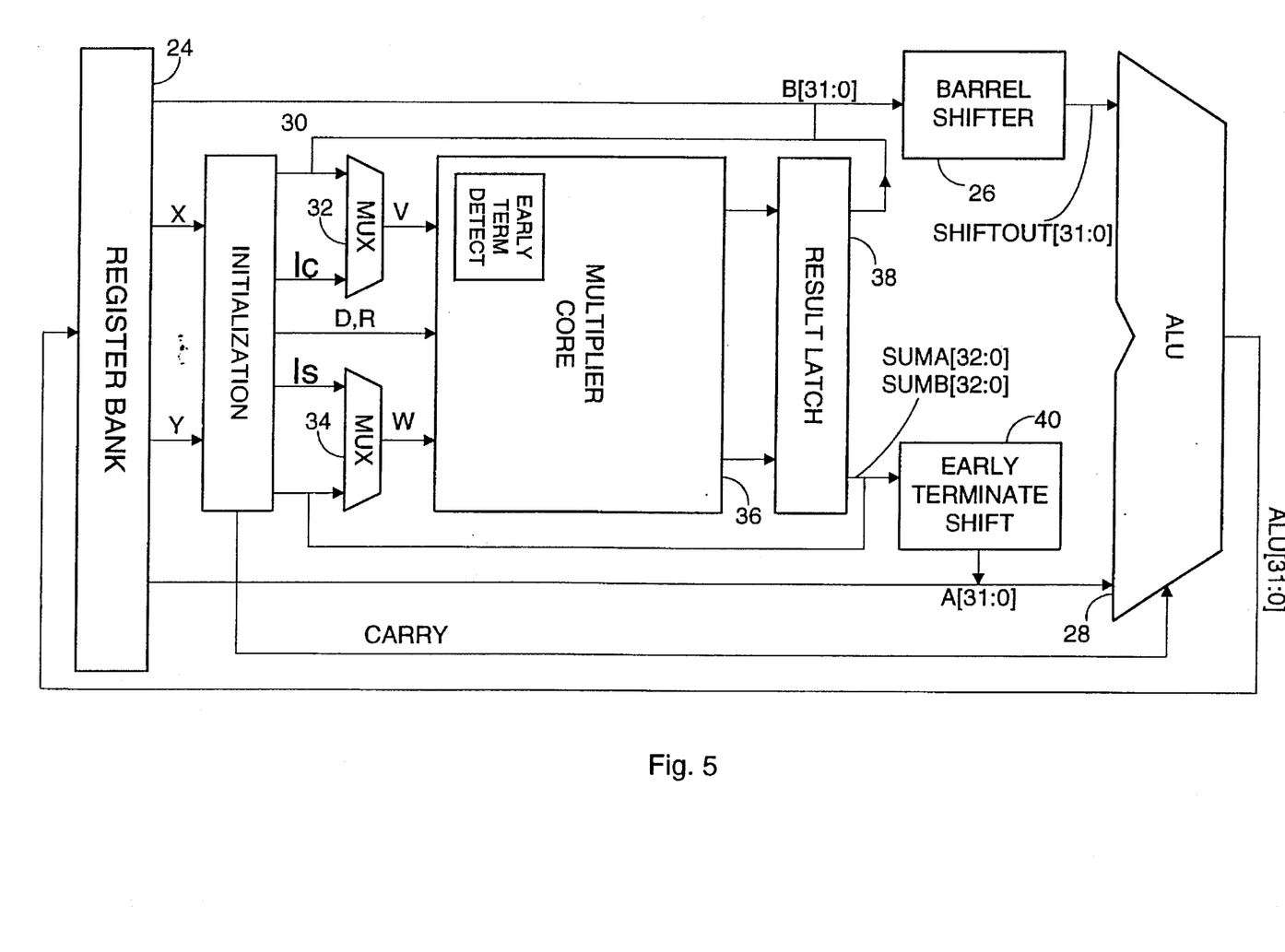
FIG. 5 illustrates an iterative multiplier reusing a general purpose barrel shifter as part of an early terminate mechanism.

FIG. 5 illustrates the circuit of FIG. 4 modified to include a special purpose multiplier. Input operands X, Y ape output from the register bank 24 to an initialisation unit 30 which serves to initialise the rest of the multiplier and pass R and D, the latched versions of the input operands directly to an iterative multiplier core 36.

The initialisation value Ic is calculated from the values R and D, and passed to the multiplier cope via multiplexer 32. If the command instruction specified that this operation should perform an accumulate as well as a multiply then the accumulate operand is passed from the register bank 24 upon an additional cycle to the initialisation unit 30. This additional cycle is inserted in the cycle sequence immediately prior to the cycle which passes the values R and D. The latched accumulate operand Is is passed to the multiplier core via multiplexer 34. If the command instruction specified that this operation should not perform an accumulate then Is is set to zero. As part of the initialisation operation a Carry bit is produced as a consequence of the manner in which this particular iterative multiplier core 36 initialises one of the carry and save values in a modified Booth summand with the carry bit needing to be adding into the result at the end to produce the correct result.

The multiplier cope 36 iteratively performs its multiplication operation upon the input operands D, R and multiplexer outputs V and W, storing the partial results in carry-save form within a result latch 38 and feeding back at least some of the bits of the partial results to the inputs of the multiplier core 36 via the multiplexers 32, 34.

When an early terminate is detected (e.g. one of the input operands X, Y is a small number limiting the number of bits of the result), or when the multiplier completes all four iterations, then the partial results within the result latch 38 are passed to the arithmetic logic unit 28 via the general purpose barrel shifter 26 and an early terminate shift mechanism 40. The general purpose barrel shifter 26 and the early terminate shift mechanism 40 perform a bit realignment of the partial results, dependent upon the number of iterative cycles the multiplier core 36 has performed prior to the early terminate occurring. Generally speaking, the fewer the number of iterative cycles that have been performed, the larger will be the required bit realignment. The arithmetic logic unit 28 receives the realigned partial results (e.g. a carry result and a save result) from the general purpose barrel shifter 26 and the early terminate shift mechanism 40 and adds these and the Carry bit to produce the final result which is then stored back in the register bank 24.

The multiplier operation 36 can terminate after one, two, three or four iterations of the multiplier core. After the core iterations, there are one or two cycles to pass the core output values through the general purpose barrel shifter 26, the early terminate shift mechanism 40, the arithmetic logic unit 28 and write the result into the register bank 24. The first of these cycles WL always occurs and writes the low 32 bits of the result to the designated result register. The second of these cycles WH will occur if the multiply instruction specifies that the high 64 bits of the result are also to be written to a register.

Table 1 below gives the operation performed by the general purpose barrel shifter 26 in each of the eight cases in which it is used during a multiply instruction to bring about bit realignment for the carry value from the iterative multiplier core 36.

TABLE 1

| Cycle | Multiplier Core Iterations | Associated Barrel Shifter Operation |
|---|---|---|
| WL | 1 | Rotate Right 22 bits |
| WL | 2 | Rotate Right 14 bits |
| WL | 3 | Rotate Right 6 bits |
| WL | 4 | Rotate Right 30 bits |
| WH | 1 | Arithmetic Shift Right 22 bits |
| WH | 2 | Arithmetic Shift Right 14 bits |
| WH | 3 | Arithmetic Shift Right 6 bits |
| WH | 4 | Rotate Right 30 bits |

The early terminate shift mechanism 40 used to correct the alignment of the sum result (also be known as the save value) from the iterative multiplier core 36 also performs a selection function as part of the same operation. The early terminate shift mechanism 40 accepts two 33-bit buses from the iterative multiplier core 36, here called suma[32:0] and sumb[32:0], which together represent the 66-bit sum result. Table 2 below shows which bits from these input buses are selected to be fed onto the bus A[31:0] to the arithmetic logic unit 28.

TABLE 2

| Cycle | Multiplier Core Iterations | Bits selected Onto Bus A[31:0] |
|---|---|---|
| WL | 1 | sumb[22:0], suma[8:0] |
| WL | 2 | sumb[14:0], suma[16:0] |
| WL | 3 | sumb[6:0], suma[24:0] |
| WL | 4 | suma[31:0] |
| WH | 1 | suma[31:10], sumb[32:23] |
| WH | 2 | suma[31:18], sumb[32:15] |
| WH | 3 | suma[31:26], sumb[32:7] |
| WH | 4 | sumb[30:0], suma[32] |

Examples of the values on the various buses duping the cycles in which early termination bit realignment is performed will now be given for the cases of calculating (all values in hexadecimal):

(1) 1×1;

(2) 100×100;

(3) 10000×10000; and (4) 1000000×1000000.

These values were chosen because they complete after one, two, three and four iterative cycles respectively. The values ape given for the following buses set out in Table 3.

TABLE 3

| Bus Name | Description |
|---|---|
| B[31:0] | Multiplier carry-result output and barrel shifter input |
| ShiftOut[31:0] | Barrel shifter output and ALU input |
| suma[32:0] sumb[32:0] | Together, the two 33-bit buses which form the multiplier sum-result |
| A[31:0] | Early terminate shift mechanism output |
| Carry | Carry-in to the ALU supplied from the initialisation of the multiplier |
| ALU[31:0] | ALU result to be written into the register bank |

EXAMPLE 1

Calculating 1×1, Which Terminates After 1 Iterative Cycle

Cycle WL: B= 01000000, suma= 0000001FC, sumb= 0FFFFFFFF, Carry= 1, ShiftOout= 00000004, A= FFFFFFFC and ALU= 00000001. Cycle WH: B= 80000000, suma= 0000001FC, sumb= 0FFFFFFFF, Carry= 1, ShiftOout= FFFFFE00, A= 000001FF and ALU= 00000000.

EXAMPLE 2

Calculating 100×100, Which Terminates After 2 Iterative Cycles

Cycle WL: B= 01200000, suma= 00001FC80, sumb= 0FFFFFFFF, Carry= 0, ShiftOout= 00000480, A= FFFFFC80 and ALU= 00000100. Cycle WH: B= 80000000, suma= 0000001FC, sumb= 0FFFFFFFF, Carry= 1, ShiftOout= FFFFFE00, A= 000001FF and ALU= 00000000.

EXAMPLE 3

Calculating 10000×10000, Which Terminates After 3 Iterative Cycles

Cycle WL: B= 01200000, suma= 001FC8000, sumb= 0FFFFFFFF, Carry= 0, ShiftOout= 00048000, A= FFFC8000 and ALU= 00010000. Cycle WH: B= 80000000, suma= 001FC8000, sumb= 0FFFFFFFF, Carry= 1, ShiftOout= FE000000, A= 01FFFFFF and ALU= 00000000.

EXAMPLE 4

Calculating 1000000×1000000, Which Terminates After 4 Iterative Cycles

Cycle WL: B= 01200000, suma= 1FC800000, sumb= 0FFFFFFFF, Carry= 0, ShiftOout= 04800000, A= FC800000 and ALU= 01000000. Cycle WH: B= 00000000, suma= 1FC800000, sumb= 0FFFFFFFF, Carry= 1, ShiftOout= 00000000, A= FFFFFFFF and ALU= 00000000.

The general purpose barrel shifter 26 can be reused in circumstances where a non-redundant data representation is used such that only a single result is output by the multiplier core 36. In this case, the separate early terminate shift mechanism 40 would not be required. It is possible that the relative positions of the general purpose barrel shifter 26 and the arithmetic logic unit 28 could be reversed. In this case, it would be necessary for the arithmetic logic unit 28 to implement a number of special purpose additions, one for each different stage at which the multiplication operation can early terminate, to be performed prior to the final result being produced by an appropriate variable length shift within the general purpose barrel shifter 26.

The arrangement of the general purpose barrel shifter 26 upstream of the arithmetic logic unit 28 particularly facilitates its reuse for early terminate realignment by the multiplier. General purpose barrel shifters are usually provided in parallel with an arithmetic logic unit or downstream of an arithmetic logic unit.

Although an embodiment of the invention has been particularly described with reference to a synchronous logic system, it will be appreciated that the invention is also applicable to aysnchronous logic systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for performing a selectable one of a plurality of different data processing operations upon one or more input operands, which of said plurality of different data processing operation is performed being selected in dependence upon one of a plurality of instruction commands, said plurality of instruction commands including a multiplication command, said apparatus comprising:

(a) an iterative multiplier for performing a multiplication operation to produce a multiplication result in response to a multiplication command, said iterative multiplier comprising:
  (i) a multiplier core;
  (ii) a feedback circuit for feeding back partial results from an output of said multiplier core to an input of said multiplier core to effect iterative operation; and
  (iii) an early terminating circuit connected for early terminating operation of said iterative multiplier when further iterations will not change said multiplication result;

(b) a general purpose shift circuit connected for performing a variable length shift upon one of said input operands in response to one or more of said plurality of instruction commands other than said multiplication command; and (c) a circuit responsive to early termination of said iterative multiplier for passing one of said partial results output from said multiplier core to said general purpose shift circuit for bit realignment by said general purpose shift circuit as part of generating said multiplication result.

2. Apparatus as claimed in claim 1, wherein said iterative multiplier uses a redundant data representation yielding at least two partial results upon each iteration.

3. Apparatus as claimed in claim 2, wherein said redundant data representation is a carry-save representation.

4. Apparatus as claimed in claim 2, further comprising at least one early terminate shift circuit coupled to the iterative multiplier for bit realigning said partial results not passed to said general purpose shift circuit.

5. Apparatus as claimed in claim 2, further comprising an adder coupled to the iterative multiplier for producing said multiplication result from said partial results.

6. Apparatus as claimed in claim 5, wherein said adder comprises an arithmetic logic unit for performing addition operations and logical operations.

7. Apparatus as claimed in claim 6, wherein said arithmetic logic unit has a plurality of operand input connections, one of said plurality of operand input connections receiving an output of said general purpose shift circuit.

8. Apparatus as claimed in claim 1, wherein said general purpose shift circuit comprises a barrel shifter.

9. Apparatus as claimed in claim 1, wherein said apparatus is an integrated circuit.

10. A method of performing a selectable one of a plurality of different data processing operations upon one or more input operands selectively using a general purpose shift circuit, which of said plurality of different data processing operations is performed being selected in dependence upon one of a plurality of instruction commands, said plurality of instruction commands including a multiplication command, said method comprising the steps of:

(a) in response to a multiplication command performing an iterative multiplication operation to produce a multiplication result, said iterative multiplication operation comprising:
  (i) generating partial results;
  (ii) feeding back said partial results to effect iterative operation; and
  (iii) early terminating said iterative multiplication when further iterations will not change said multiplication result;

(b) in response to one or more of said plurality of instruction commands other than said multiplication command, performing a variable length shift with said general purpose shift circuit upon an input operand; and (c) in response to early termination of said iterative multiplication operation, passing one of said partial results to said general purpose shift circuit for bit realignment by said general purpose shift circuit as part of generating said multiplication result.

* * * * *